(12) United States Patent
Murphy et al.

(10) Patent No.: US 7,403,674 B2
(45) Date of Patent: Jul. 22, 2008

(54) INTRUSION DETECTION SYSTEM FOR A MULTIMODE OPTICAL FIBER USING A BULK OPTICAL WAVELENGTH DIVISION MULTIPLEXER FOR MAINTAINING MODAL POWER DISTRIBUTION

(75) Inventors: Cary R. Murphy, Hickory, NC (US); Mark K. Bridges, Hickory, NC (US); David E. Vokey, Sidney (CA)

(73) Assignee: Network Integrity Systems Inc., Conover, NC (US)

( * ) Notice: Subject to any disclaimer, the term of this patent is extended or adjusted under 35 U.S.C. 154(b) by 0 days.

(21) Appl. No.: 11/461,905

(22) Filed: Aug. 2, 2006

(65) Prior Publication Data

US 2007/0086693 A1    Apr. 19, 2007

Related U.S. Application Data

(63) Continuation-in-part of application No. 11/137,777, filed on May 26, 2005, now Pat. No. 7,092,586, which is a continuation-in-part of application No. PCT/US2004/021268, filed on Jul. 2, 2004.

(60) Provisional application No. 60/704,925, filed on Aug. 3, 2005, provisional application No. 60/488,374, filed on Jul. 18, 2003.

(51) Int. Cl.
*G02B 6/00* (2006.01)
*G02B 6/26* (2006.01)
*H04B 17/00* (2006.01)
*H04B 10/00* (2006.01)

(52) U.S. Cl. .............................. 385/12; 385/13; 385/29; 398/20; 398/28; 398/33

(58) Field of Classification Search .................. 385/12, 385/13, 29
See application file for complete search history.

(56) References Cited

U.S. PATENT DOCUMENTS 4,973,169 A * 11/1990 Slonecker .................... 398/79
5,003,623 A *  3/1991 Asawa ........................ 398/44

(Continued)

FOREIGN PATENT DOCUMENTS

WO        WO 00/37925       3/1996

(Continued)

*Primary Examiner*—Michelle R. Connelly-Cushwa
(74) *Attorney, Agent, or Firm*—Adrian D. Battison; Michael R. Williams; Ryan W. Dupuis

(57) ABSTRACT

Intrusion detection of one section only of a multimode fiber uses a light signal launched into the fiber at a location spaced from the source through a single mode fiber to establish a narrow spectral width, under-filled non-uniform mode field power distribution in the fiber. A small portion of the higher order signal modes at the a second location also spaced from the destination is sampled by a tap coupler and monitored for transient changes in the mode field power distribution which are characteristic of intrusion to activate an alarm. A fiber being used for data transmission can be monitored for intrusion by introducing a monitor wavelength different from that of the data signal. Central to this invention is the use of a bulk optic (commonly referred to as a pass/reflect) wavelength division multiplexer, one which maintains the modal distribution within the fiber.

4 Claims, 4 Drawing Sheets

U.S. PATENT DOCUMENTS

| | | | |
|---|---|---|---|
| 5,712,937 A * | 1/1998 | Asawa et al. | 385/49 |
| 6,819,849 B1 * | 11/2004 | Tangonan et al. | 385/126 |
| 7,092,586 B2 * | 8/2006 | Vokey et al. | 385/12 |
| 7,120,324 B2 * | 10/2006 | Murphy et al. | 385/12 |
| 2006/0002649 A1 * | 1/2006 | Murphy et al. | 385/12 |
| 2006/0002650 A1 * | 1/2006 | Vokey et al. | 385/12 |
| 2007/0086693 A1 * | 4/2007 | Murphy et al. | 385/12 |
| 2007/0092176 A1 * | 4/2007 | Murphy et al. | 385/13 |
| 2007/0116400 A1 * | 5/2007 | Murphy et al. | 385/12 |
| 2007/0133922 A1 * | 6/2007 | Murphy et al. | 385/12 |

FOREIGN PATENT DOCUMENTS

| | | |
|---|---|---|
| WO | WO 96/08695 | 6/2000 |
| WO | WO 00/67400 | 11/2000 |

* cited by examiner

INTRUSION DETECTION SYSTEM FOR A MULTIMODE OPTICAL FIBER USING A BULK OPTICAL WAVELENGTH DIVISION MULTIPLEXER FOR MAINTAINING MODAL POWER DISTRIBUTION

This application is a continuation in part of application Ser. No. 11/137,777 filed 26 May 2005 now U.S. Pat. No. 7,092,586 which is a continuation-in-part application of PCT Application PCT/US2004/021268 filed 2 Jul. 2004.

This application claims the benefit of the priority date under 35U.S.C.119 from Provisional Application 60/488,374 filed 18 Jul. 2003.

This application claims the benefit of the priority date under 35U.S.C.119 from Provisional Application 60/704,925 filed 3 Aug. 2005.

FIELD OF THE INVENTION

The present invention relates to the detection of physical intrusion into a optical fiber and particularly to use of a bulk optical wavelength division multiplexer, otherwise known as a pass/reflect WDM for maintaining modal power distribution.

BACKGROUND OF THE INVENTION

Gigabit Ethernet multimode fiber optic backbone cables are being deployed to connect sections of high-speed networks together. To secure these high-speed networks, software based Intrusion Detection Systems (IDSs) have been introduced. These systems capture and analyze all packets for unusual patterns that point to an intrusion. However, this adds to the complexity of the network. Current IDSs are hampered by a Base-Rate Fallacy limitation, which is the inability to suppress false alarms. Additionally, software-based IDSs do not protect against passive optical fiber tapping, which can go undetected by the network hardware.

It is well known, by those skilled in the technology, that an optical fiber can are easily be tapped and the data stream intercepted. One relatively simple non-interruptive tapping method involves placing a bend coupler on the fiber to be tapped. A controlled bend of a critical radius is placed on the fiber. This causes a small spatial distortion in the core/cladding guiding properties and a fraction of the light escapes the fiber. A detector is located at the point of the light leakage and the data steam intercepted. Bend couplers typically introduce a loss of light power of up to 1 dB or more. Power measuring intrusion detection systems are available to detect this loss in optical power and provide warning alarms.

With care and skill, more insidious methods are available to the skilled intruder. With a sufficiently sensitive receiver and care in preparation, a fiber can be successfully tapped without introducing a telltale bend in the optical fiber. A successful tap can be achieved by carefully removing a short length, in the order of a few centimeters or inches of the protective outer coating of the target fiber and polishing the outer cladding down by a few microns to form a flat coupling region. A cladding-to-cladding coupling is then made using a special intercept fiber. This method intercepts a portion of the weak but measurable cladding mode power that propagates in the tapped fiber. In this case, the intercepted light, which may be detected by a sensitive receiver, can easily be 20 or 30 dB down from the power in the fiber core. This results in a loss of received optical power of only 0.04 or 0.004 dBm and is impossible to detect reliably by power measurement methods. The present invention addresses the limitations of current power loss detection methods and can detect intrusion activity before any optical power loss occurs.

Previous systems for detecting intrusions in multi-mode fibers are shown in PCT published applications WO 96/08695 published 21 Mar. 1996, WO 00/37925 published 29 Jun. 2000 and WO 00/67400 published 9 Nov. 2000 all assigned to Future Fibre Technologies of Australia.

SUMMARY OF THE INVENTION

It is one object of the present invention to provide a method of detecting movement of a fiber which may indicate a potential intrusion.

According to the invention there is provided a method of detecting intrusion into a multimode optical fiber comprising:

launching a monitoring light signal into one end of the optical fiber from a source of light so as to establish a non-uniform mode field power distribution in the optical fiber;

launching into said one end of the optical fiber a data signal at a different wavelength from the monitoring signal for transmission along the fiber with the monitoring signal;

using a coupler to separate the data signal from the monitoring signal;

capturing a portion of higher order signal modes of the monitoring signal passing through the fiber to provide a sample signal;

monitoring the sample signal for transient changes in the mode field power distribution that are characteristic of cable handling; and activating an alarm in response to detection of said changes wherein coupler used for separating the data signal from the monitoring signal comprises a bulk optical wavelength division multiplexer.

It is important in this method that the light signal establishes a narrow spectral width, under-filled, non-uniform mode field power distribution in the multimode optical fiber.

It is also important that the signal is captured by a tap coupler which is made by a cladding-to-cladding fusion which provides a predetermined tap-coupling ratio.

At the distal, receive end of the link, a small percentage of the optical signal is sampled using a specially constructed optic coupler which captures a portion of the higher order mode power. An optical receiver detects the sampled signal and the modal power distribution is monitored for changes. Mechanical disturbances such as handling of the fiber cable cause shifts in the mode power distribution that are detected by the system, which signals a possible intrusion attempt before an actual tap occurs.

Using adaptive filtering, normal background disturbances from heating/cooling systems, motors, fans and other building systems can be learned and filtered out. This will allow maximum sensitivity to intrusion attempt signatures while minimizing the probability of false alarm events. The design objective is to identify intrusion attempts while the attack is still at the outer layer of the cable structure. This will allow for rapid location and interception of any intruder.

In modal metric multimode physical layer intrusion detection systems, preservation of modal distribution is crucial. It is well known by those in the field that an optical fiber can be monitored simultaneously with active data by use of a wavelength division multiplexer (WDM) to combine the two signals for transport down the fiber, then separation at the other end.

In this invention, the specialized optical component used for the WDM function is a pass/reflect WDM, also called a "bulk optical WDM". This is selected and used, not only for the wavelength multiplexing/demultiplexing capability, but because of its modal characteristics. Fused couplers, such as standard 50:50 and asymmetrical tap couplers disturb the modal distribution. The farther the coupler split ration is from perfect 50/50 symmetry, the greater the impact on modal distribution. In this invention, a modally insensitive device is chosen, including but not limited to a pass/reflect.

At the near end, the monitoring light of one wavelength is multiplexed with a separate data signal of another wavelength by use of a bulk optic, also known as pass-reflect, wavelength division multiplexer (WDM). This technology is fundamental to this invention as this technology of WDM maintains modal distribution within the multi-mode optical fiber.

At the distal end, a similar bulk optic WDM is used in mirror fashion, separating the data and monitoring wavelengths for distribution.

BRIEF DESCRIPTION OF THE DRAWINGS

In the accompanying drawings, which illustrate exemplary embodiments of the present invention.

DETAILED DESCRIPTION

Figure 1:
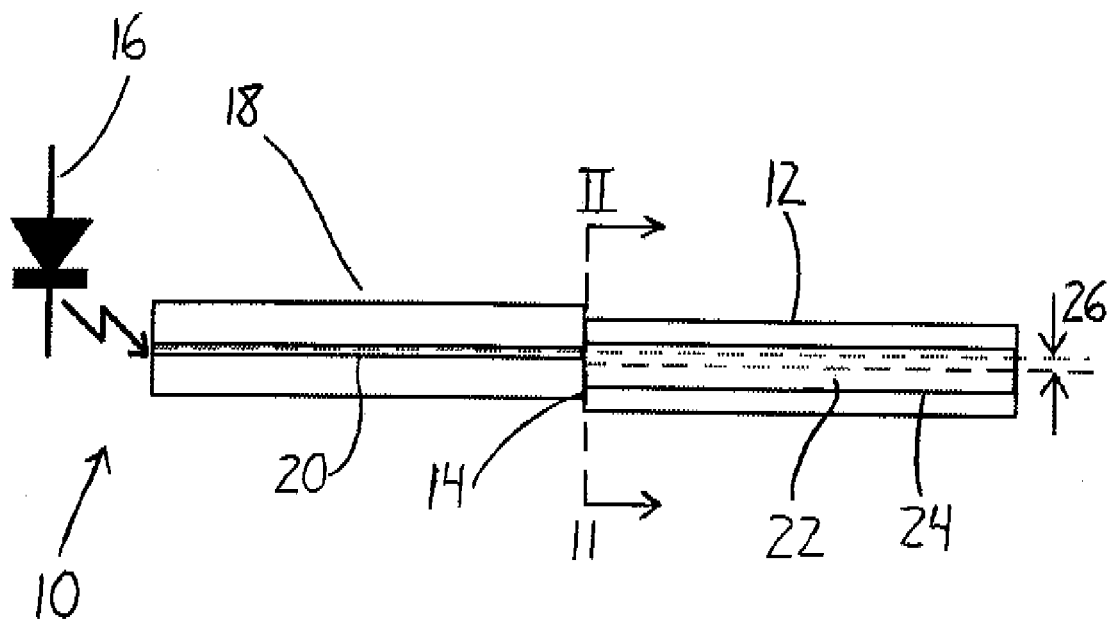
FIG. 1 is a longitudinal cross section showing an offset launch arrangement including a single mode fiber connected to a multimode fiber to be monitored for use in a system according to the present invention.
Figure 2:
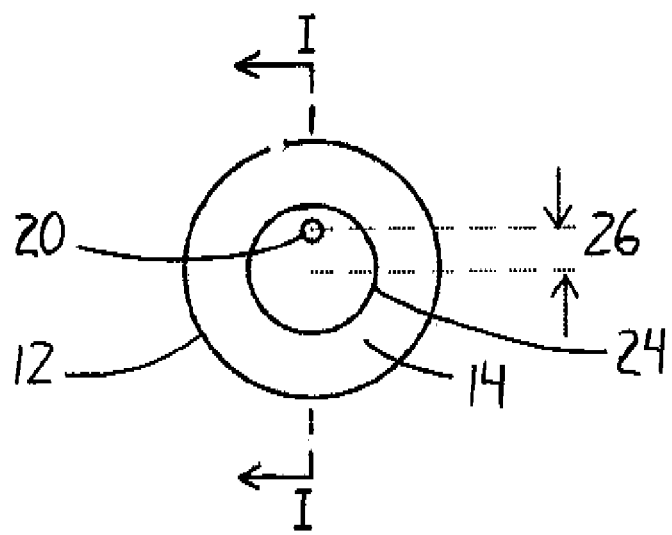
FIG. 2 is a transverse cross section of the fibers of FIG. 1.

Referring to the accompanying drawings, and particularly to FIGS. 1 and 2, a transmitter 10 is illustrated for setting up a narrow spectral width, under-filled, non-uniform mode field power distribution in a multimode optical fiber 12. With this type of mode field, the power distribution in the higher order modes changes with physical disturbance of the fiber, despite the absence of any power loss caused by the disturbance.

The non-uniform high order mode field may be set up in the multimode fiber 12 by illuminating the proximal (near) or transmit end 14 of the fiber with a point source of light that is offset from the center of the optical fiber core. This can be accomplished by a using a laser, optical lenses and positioning mechanics. In the illustrated embodiment, however, this is accomplished more simply by launching a laser 16 into a short length of single mode fiber 18 spliced to the multimode fiber with the center of its core 20 offset from the center 22 of the core 24 of the multimode fiber 12 by a fixed offset 26. For typical multimode fibers with either a 50 or 62.5 micron core, the single mode fiber, with a core size of approximately 10 microns, is spliced to the multimode fiber with a micron center-to-center offset which is optimized for maximum sensitivity (typically 5 to 20 micron offset). This is referred to as a Mode Conditioning Pigtailed (MCP)

Figure 3:
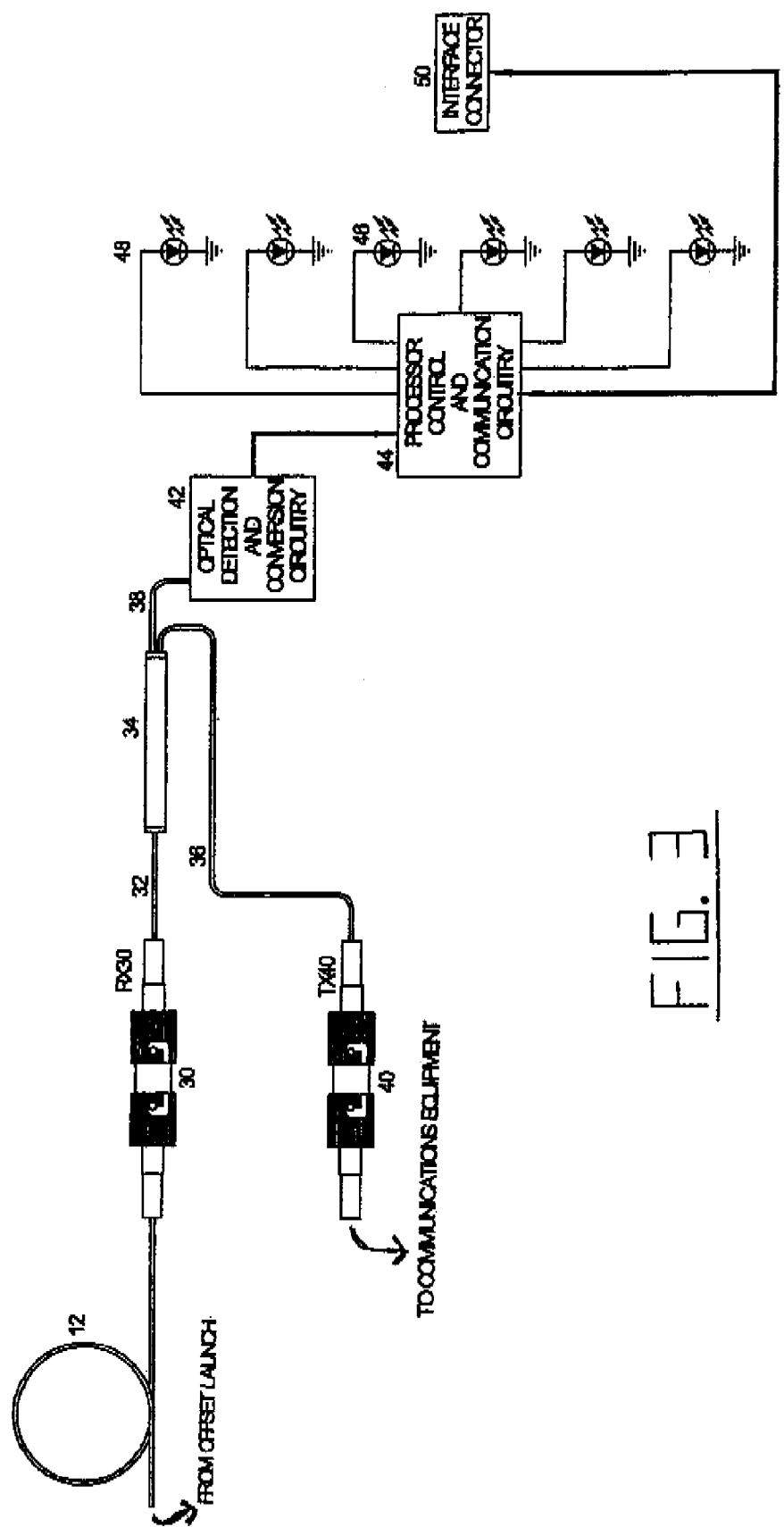
FIG. 3 is a block diagram of the receive end of the fiber to be monitored and a receiver portion of an intrusion detection system according to the present invention.

Referring more particularly to FIG. 3, at its distal (remote) or receive end 28 (FIG. 1) the multimode optical fiber 12 is connected to a connector 30, the receive port $RX_{30}$ of which delivers the incoming signal from the fiber to the input 32 of a high order mode coupler 34. The coupler taps off a small portion of the higher order modes and returns the remaining optical power to an output port 36. Handling of the fiber cable will cause a local mechanical disturbance to the fiber. This mechanical disturbance, while not introducing detectable macro or micro bending losses, causes the power distribution in the mode pattern to change. This in turn results in a change of the coupling efficiency of the high order mode coupler and a variation in the optical power at a coupler output 38. The resultant optical signal is proportional in amplitude to the disturbing forces.

The high order mode coupler 34 can be made by a cladding-to-cladding fusion while measuring the tap-coupling ratio during the fusing process using an offset launch source as described.

The main portion of the optical signal is brought from coupler output 36 to the transmit port $TX_{40}$ of an optical connector 40 and is available for a communication or data receiver when active fiber monitoring is employed. The sampled output 38 of the mode coupler is forwarded to a detector and conversion circuit 42 where the optical signal is detected by a photo diode and the resulting electrical output converted from an analog to a digital signal. The digital signal is forwarded to a microprocessor control and communications assembly 44 where the signal is filtered to eliminate normal environmental background noise. The filtered signal is then analyzed for transient signatures and level changes that are characteristic of cable and fiber handling. At a pre-set disturbance level the assembly activates an alarm response. An alarm LED 46 is illuminated on a system status panel 48 and an alarm signal is output to an interface connector 50 for remote alarm reporting.

Figure 4:
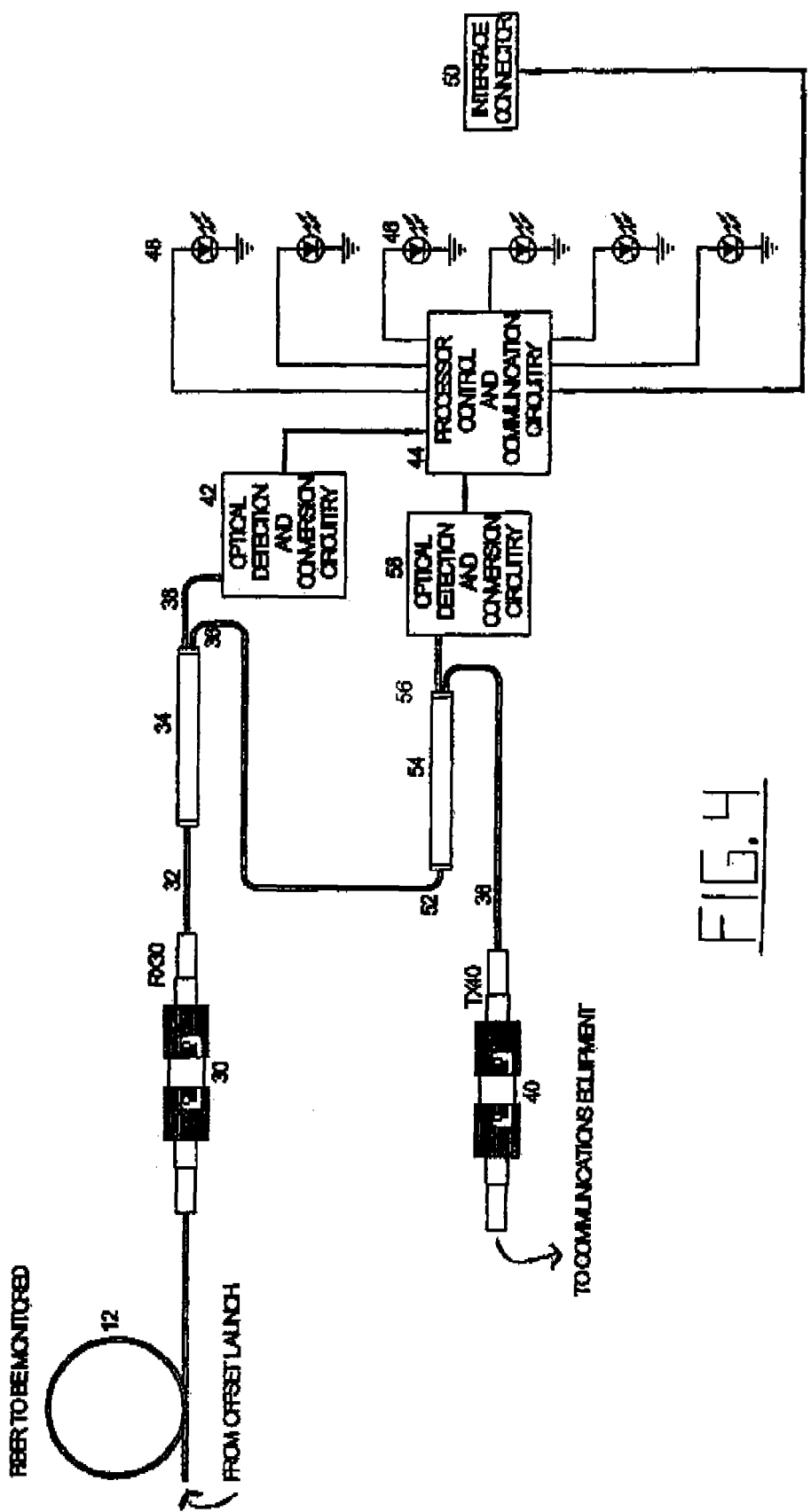
FIG. 4 is a block diagram of an alternative receiver portion of a system according to the present invention.

An enhanced variation of the detection scheme is shown in FIG. 4. The incoming optical signal is delivered, through connector 30 to the input 32 of the high order mode coupler 34 where the high order mode power distribution is sampled. The output 36 of the high order mode coupler 34 is then transmitted to the input port 52 of a bulk optics coupler 54. The bulk optics coupler is insensitive to modal power distribution and is used to sample a portion of the total optical signal. The sampled output of the bulk optics connecter 54 is delivered from output port 56 to a second detector circuit 58 where the absolute throughput power is calculated from the fixed ratio sample. This establishes an absolute power baseline that is compared to the high order mode sampling in the microprocessor and communications module 44. The microprocessor then compares the response in the two channels and is able to calculate any power change as well as changes in modal power distribution. Excessive power change levels produce an alarm indication at LED 60, and an alarm signal is sent to connector 50 This provides more information on fiber disturbances as a significant change in both channels could indicate a problem with the laser or fiber path while a transient and steady state change in the high order mode power distribution only would provide a strong indication of an intrusion attempt.

Thus, fundamental to the arrangement herein is the setting up of an under-filled, non-uniform mode field power distribution in the multimode optical fiber. A non-uniform high order mode field can be set up in a multimode fiber by illumination the end of the fiber with a non-divergent source of light that is offset from the center of the optical fiber core. This can be accomplished, as described before, by a using a laser, optical lenses and positioning mechanics or more simply by launching a laser into a single mode fiber and concatenating the single mode fiber to a multi mode fiber with a fixed offset. This is referred to as a Mode Conditioning Pigtail (MCP).

For typical multimode fibers with either a 50 or 62.5 micron core, the single mode fiber, with a core size of approximately 10 microns, is spliced to the multimode fiber with a micron center-to-center offset which is optimized for maximum sensitivity (typically 5 to 20 micron offset). The high order mode coupler can be made by a cladding-to-cladding fusion while measuring the tap-coupling ratio during the fusing process using an offset launch source as described.

The asymmetrically tapped coupler 81, which is preferably a fused biconic taper coupler and may have a ratio such as a 90:10 ratio, is capable of separating offset propagation modes from the bulk optical launch distribution by stripping off a small portion of the higher order modes which is transmitted to a receiver RX2 83. Handling of the fiber cable causes a local mechanical disturbance to the fiber. This mechanical disturbance, while not introducing detectable macro or micro bending losses, causes the power distribution in the mode pattern to change. This results in a change of the coupling efficiency of the high order mode coupler and a variation in the optical power at the output port feeding R×2 83 which detects intrusions. The resultant optical signal is proportional in amplitude to the disturbing forces. The bulk optical signal, typically from the larger % tap ratio leg of the asymmetrical coupler, feeds RX1 82, and monitors non-intrusion affected light.

The other output of the two receivers is connected to a processor 84 where the absolute throughput power is calculated from the sum of the two receivers. This establishes an absolute power baseline that is compared to the higher order mode signal. The processor then compares the response in the two channels and is able to calculate any power change as well as changes indicative of an intrusion or fiber handling. This comparison can be performed in the digital domain including use of equipment such as, but not limited to a computer, or the analog domain using circuitry such as, but not limited to, a differential amplifier. This provides more information on fiber disturbances as a significant change in both channels could indicate a problem with the laser or fiber path while a transient and steady state change in the modal distribution only would provide a strong indication of an intrusion attempt.

Figure 5:
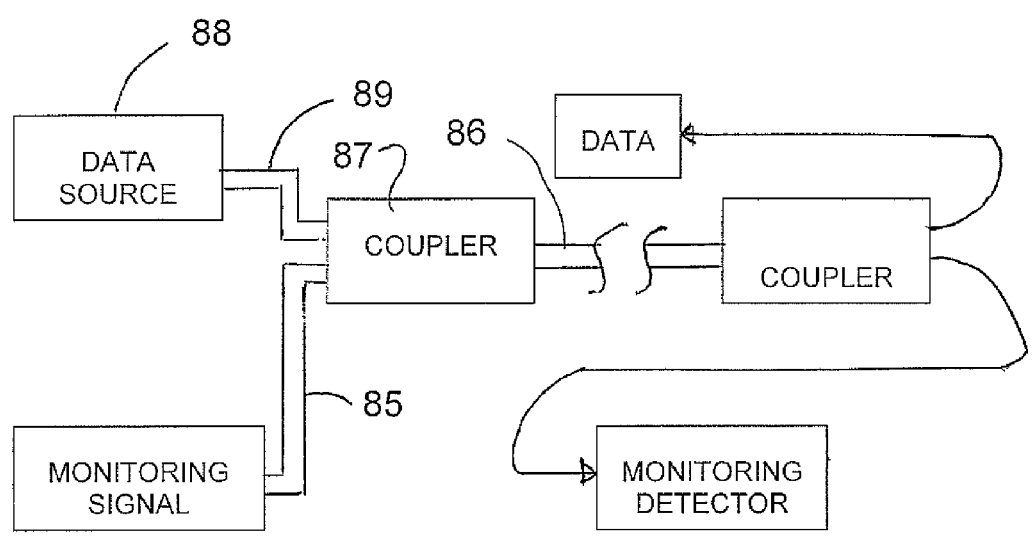
FIG. 5 is a block diagram of another embodiment of this invention which uses a bulk optical wavelength division multiplexer to combine the monitoring signal with a data signal.

In the arrangement shown in FIG. 5, the fiber is not continuous and includes a first portion 85 connected to the remainder or main portion 86 of the fiber to be monitored by a coupler 87 dividing the initial portion 85 from the remaining portion 86 so that the light signal is launched into the first portion of the fiber which is connected to the remaining portion at the coupler. The signal is launched into the first portion using the offset launch arrangement and the wavelength as discussed hereinbefore. In this arrangement the coupler 87 must be of the type which transmits the non-uniform mode field power distribution in the first portion of the multimode optical fiber into the remaining portion which is the portion to be monitored.

The coupler 87 is preferably a bulk optical wavelength division multiplexer which combines into the remaining portion 86 of the fiber both the light signal and a data signal from a data source 88 on a fiber portion 89 where the data source is at a different wavelength from the light signal.

Thus the system shown in FIG. 5 uses an offset launch and tap coupler in order to monitor fiber movement to alarm against handling or intrusion as previously described. Non-symmetrical couplers, such as tap, non-symmetrically distribute modal density. However the use of a bulk optics coupler maintains modal distribution. It is therefore an important feature of this device that it provides multiplexing in a monitor wavelength by using a bulk optical wavelength division multiplexer (WDM), such that the fiber can be monitored for handling in the presence of customer data. This arrangement has the advantages that it can be used in the presence or absence of any data signals. Thus if the fiber initially is set up without the intention to include data, it can be monitored in this state because the coupler simply transfers the monitoring signals with no signal from the data portion 89. If it is later decided to add data on the fiber, this can be simply added by activating the source 88 connected to the portion 89. Secondly, the supplier or operator of the monitoring system has no access to the data, which is solely supplied from the separate source 88 through the coupler 87, and thus no ability to modify or replace the data so that the data is more secure. Wave division multiplexing devices of this type are readily available from a number of suppliers such as Fiber Optic Communications Inc (FOCI) and are well known to a person skilled in this art.

In the multimode physical layer intrusion detection system described above, preservation of modal distribution is crucial. Use of a wavelength division multiplexer (WDM) to combine the two signals for transport down the fiber, then separation at the other end is previously known.

However in the arrangement described herein, the specialized optical component used for the WDM function is a pass/reflect WDM, also called a "bulk optical WDM". This is selected and used, not only for the wavelength multiplexing/demultiplexing capability, but because of its modal characteristics.

A pass/reflect or bulk WDM differs from other wavelength division multiplexers in that the wavelength dividing occurs in open optics rather than, for example, fused fibers. Examples of such devices are available from FOCI Fiber Optic Communications, Inc under the designation M-MM Series Multimode Filter WDMs. This type of WDM acts to maintain modal power distribution as the signals are multiplexed and transmitted into the fiber because the fiber geometry is maintained throughout the multiplexing and demultiplexing process, as opposed to fused couplers where the change in geometry scrambles modal distribution. The full face of the fibers are exposed to the optics unaltered, and the modal characteristics carry through the optical multiplexing process. This effect is unexpected and not a commonly required or conventional characteristic of the WDM.

It is known that fused couplers, such as standard 50:50 and asymmetrical tap couplers disturb the modal distribution. The farther the coupler split ration is from perfect 50/50 symmetry, the greater the impact on modal distribution. In this invention, a modally insensitive device is chosen, including but not limited to a pass/reflect.

While specific embodiments of the invention have been described in the foregoing, these are presented by way of example only other embodiments are possible within the spirit and scope of the present invention. In particular, it is to be understood that elements of the system such as the detector and conversion circuit and the microprocessor and communications module may be replaced with any other element or elements for performing similar functions in the system. The invention is to be considered limited solely by the scope of the appended claims.

The invention claimed is:

1. A method of detecting intrusion into a multimode optical fiber comprising:

launching a monitoring light signal into one end of the optical fiber from a source of light so as to establish a non-uniform mode field power distribution in the optical fiber;

launching into said one end of the optical fiber a data signal at a different wavelength from the monitoring signal for transmission along the fiber with the monitoring signal;

using a coupler to separate the data signal from the monitoring signal;

capturing a portion of higher order signal modes of the monitoring signal passing through the fiber to provide a sample signal;

monitoring the sample signal for transient changes in the mode field power distribution that are characteristic of cable handling; and activating an alarm in response to detection of said changes wherein the coupler used for separating the data signal from the monitoring signal comprises a bulk optical wavelength division multiplexer.

2. The method according to claim 1 wherein the light signal establishes a narrow spectral width, under-filled, non-uniform mode field power distribution in the multimode optical fiber.

3. The method according to claim 1 wherein the signal is captured by a tap coupler which is made by a cladding-to-cladding fusion which provides a predetermined tap-coupling ratio.

4. The method according to claim 1 wherein the monitoring light signal and the data signal are launched into the said end of the optical fiber by a bulk optical wavelength division multiplexer.

* * * * *